United States Patent [19]

Kunz et al.

[11] Patent Number: 5,026,404

[45] Date of Patent: Jun. 25, 1991

[54] ABRASIVES

[75] Inventors: Reiner Kunz, Waldshut-Tiengen; Albert Babl, Dogern; Ales Zahradnicek, Albbruck, all of Fed. Rep. of Germany; Rainer Dietrich, Basel, Switzerland

[73] Assignee: Lonza Ltd., Gampel/Valais, Switzerland

[21] Appl. No.: 445,108

[22] Filed: Dec. 7, 1989

Related U.S. Application Data

[63] Continuation of Ser. No. 215,542, Jul. 6, 1988, abandoned.

[30] Foreign Application Priority Data

Jul. 24, 1987 [CH] Switzerland .......................... 2830/87
Aug. 31, 1987 [CH] Switzerland .......................... 3334/87

[51] Int. Cl.$^5$ ................................................. B24B 1/00
[52] U.S. Cl. ........................................... 51/295; 51/309
[58] Field of Search .................................. 51/295, 309

[56] References Cited

U.S. PATENT DOCUMENTS

| | | | |
|---|---|---|---|
| 3,528,790 | 9/1970 | Shrewsbury et al. | 51/295 |
| 4,110,083 | 8/1978 | Benedict | 51/295 |
| 4,111,668 | 9/1978 | Walker et al. | 51/295 |
| 4,157,898 | 6/1979 | Walker et al. | 51/309 |
| 4,162,899 | 7/1979 | Molnar et al. | 51/309 |
| 4,203,733 | 5/1980 | Tanaka et al. | 51/295 |

*Primary Examiner*—William R. Dixon, Jr.
*Assistant Examiner*—Willie J. Thompson
*Attorney, Agent, or Firm*—Fisher, Christen & Sabol

[57] ABSTRACT

An abrasive grain with an aluminum oxide base which is distinguished by good throwing power and by a good capability of being integrated in flexible abrasives or in grinding wheels with artificial resin bonding.

9 Claims, No Drawings

ABRASIVES

This application is a continuation of prior U.S. application Ser. No. 215,542, filed July 6, 1988.

BACKGROUND OF THE INVENTION

1. Field Of The Invention

The invention relates to a surface-treated abrasive grain with an aluminum oxide base and to an abrasive produced from it, in particular an abrasive applied to a support.

2. Prior Art

Abrasives in the form of an abrasive paper are known which exhibit large empty spaces between the individual abrasive grains and the cutting ups of all abrasive grains are in the same plane, which runs parallel to the plane of a support. To achieve this, a synthetic resin layer or a layer of glue is applied to a support and then a number of abrasive grains are put into a layer of glue by electrostatic means, against gravity, spread out and thus raised (German OS 2,125,942).

It has proven to be a drawback that, in such production processes the exposed abrasive grains show a poor jumping and alignment behavior in the electrical field. For example, in German OS 2,125,942, it is suggested that the grains be prevented from falling off of the support because of too low a strength of the electrostatic charge by applying a thin film of a highly viscous substance that keeps the grains in place until they are embedded in the layer of glue.

Other drawbacks that occur during electrostatic coating processes are that the voltage in the electrical field must be greatly increased and thus undesirable electrical discharges occur or an increased relative humidity becomes necessary in the processing area.

But all of these measures cannot prevent the coating of the support with abrasive grains from being generally uneven and leading to high rejection rates, since considerable differences in the jumping behavior are detected also within the production charges of an abrasive and thus the production yield is greatly reduced.

A further drawback is that the strength of the integration of the abrasive grains in the support is insufficient, which led to the fact that losses in the abrasive performance of such abrasives had to be accepted.

BROAD DESCRIPTION OF THE INVENTION

The object of the invention is to make available an abrasive grain that does not exhibit these drawbacks. According to the invention, such object is achieved in that the abrasive grain is surface-treated with a hygroscopic and/or hydrophilic substance, and the amount of substance is 0.001 to 5.0 percent by weight relative to the amount of the abrasive grain. Preferably, the amount of substance is 0.1 to 0.5 percent by weight relative to the amount of the abrasive grain.

To determine if the abrasive grain exhibits the required features, it proved advisable to determine the specific resistance of the abrasive grain in grain beds. Suitably, this specific resistance is smaller than $3.5 \times 10^{10}$ ohms $\times$ cm, preferably between $0.05 \times 10^{10}$ and $2.5 \times 10^{10}$ ohms $\times$ cm.

According to the invention, an abrasive grain with an aluminum oxide base in the microrange, and particularly in the macrorange, is suitable according to the FEPA standard. Abrasive grains with an aluminum oxide base are understood to be corundums, such as, pure corundum, semipure corundum, normal corundum, blue corundum treated at high-temperature, zirconium corundum, sintered corundum, or suitable one-phase or multiphase compounds. Mixtures of various corundums, such as pure corundum, blue corundum, zirconium corundum, sintered corundum, can also be used.

To achieve the object of the invention, such abrasive grains must be coated with a hygroscopic and/or hydrophilic substance.

As the hygroscopic substance, a carbonate, hydrogen carbonate, sulfate, nitrate, phosphate, fluoride or chloride of the metals of the first, second or third main group or of the first or second series of the transition metals of the periodic table, but suitably sodium carbonate, sodium hydrogen carbonate, magnesium chloride, calcium nitrate, iron chloride, alone in each case or in a mixture, can be used.

As the hydrophilic substances, superfine metal oxides such as silicon dioxide, aluminum oxide or titanium dioxide, alone in each case or in a mixture, can be used. The superfine metal oxides have a particle size of the primary particles in the $d_{50}$ value of suitably 1 to 500 nm, preferably 10 to 50 nm, and a specific surface of suitably 5 to 500 m$^2$/g, preferably 50 to 380 m$^2$/g.

Mixtures in any ratios of the hygroscopic and hydrophilic substances can also be used, provided the range given in the amounts is maintained.

Depending on the coating, the abrasive grains can be used for different purposes.

Abrasive grains with an aluminum oxide base that are coated with a hygroscopic and/or hydrophilic substance are especially suited for the uniform coating of a support exhibiting an adhesion promoter in the electrical field, i.e., to improve the throwing power.

For this process, in addition to aluminum oxide, any mixtures can be used with other corundums which could not be used originally because of the different jumping behavior of the individual components in the electrical field but which, after treatment according to the invention, show an identical jumping behavior and thus can be used.

The electrical field strength required according to the invention is between 20,000 and 100,000 v/m. The coating occurs at a relative humidity of the environment of 30 to 90 percent.

With abrasives based on an abrasive grain that is treated with a hydrophilic substance that has particles that are as fine as possible, an excellent integration or adhesion of the abrasive grain on a flexible support or in abrasives with synthetic resin bonding is additionally achieved. Such abrasives are thus suited especially for abrasive belts and grinding wheels that must achieve a high abrasive performance.

As a support, known materials such as paper, plastics, cloths or fiber-reinforced fabrics are advantageously used. An adhesion promoter is usually applied on one side of this support.

As an adhesion promoter, the usual glues or adhesives such as wood glue, bakelite, and the resins of phenol, aldehyde, urea, formaldehyde, epoxy, polyester or polyuretane can be used.

Before application to the support, the abrasive grain according to the invention is treated with a hygroscopic and/or hydrophilic substance. For this purpose the hygroscopic substances are dissolved, the hydrophilic substances, to the extent they are insoluble, are suspended in a carrier, and the abrasive grain or said mixtures are added to this solution or suspension and the solvent or the carrier is removed by drying, for example by allowing drying, by evaporation or by spray drying. The individual components must be balanced so that a coated abrasive grain with the portions of abrasive grain and substance according to the invention is produced.

Further processing technique for the highly disperse hydrophilic substances is that the abrasive grain is put into a mixer (an eccentric tumbling mixer, a rotary mixer, a free falling mixer) and is mixed dry with the substances, selected for example from the series of the materials described herein or a mixture from this series.

The weight ratio according to the invention is set by the suitable selection of the amount of abrasive grain relative to substance.

The treated abrasive grain can then be fed to coating devices known in the art and can be processed in them in known manners.

By comparative tests it is shown that, on the one hand, the throwing power and, on the other hand, the abrasive performance of suitably produced abrasives can clearly be improved.

DETAILED DESCRIPTION OF THE INVENTION

Example 1

Normal corundum treated at high temperature (Dural HT) of granularity 36 and 60 according to the FEPA standard from various production charges was used. The sample amounts in each case were halved and the one half was produced according to the invention with 0.2 percent by weight of highly dispersed $Al_2O_3$ ($d_{50}$ = 20 nm, BET = 100 ± 15 $m^2/g$) by making a slurry in water and drying at 200° C. The throwing power was tested in a laboratory test device under constantly maintained conditions. The percent by weight of grains adhering to an adhesive belt was used as a measure for the throwing power, and the grains had to jump from a support in the electrical field against gravity onto the adhesive belt. The specific resistance values were measured with constantly maintained conditions in cylindrical grain beds (diameter 30 mm, grain amount 2 g). The measuring device: hand generator 5,000 V, measuring range 1 × $10^6$ to 4 × $10^9$ ohms. The results are shown in Table I:

TABLE I

| Dural HT | | Untreated | Treated with 0.2 percent of $Al_2O_3$ |
|---|---|---|---|
| Grain 36 | | | |
| A | Specific resistance, Ohm × cm | >12 × $10^{10}$ | 0.4 × $10^{10}$ |
| | Throwing power, percent | 8 | 92 |
| B | Specific resistance, Ohm × cm | >12 × $10^{10}$ | 0.2 × $10^{10}$ |
| | Throwing power, percent | 12 | 96 |
| C | Specific resistance, Ohm × cm | >12 × $10^{10}$ | 1.0 × $10^{10}$ |
| | Throwing power, percent | 0 | 96 |
| Grain 60 | | | |
| D | Specific resistance, Ohm × cm | >12 × $10^{10}$ | 0.9 × $10^{10}$ |
| | Throwing power, percent | 4 | 96 |
| E | Specific resistance, Ohm × cm | >12 × $10^{10}$ | 0.6 × $10^{10}$ |
| | Throwing power, percent | 54 | 96 |
| F | Specific resistance, Ohm × cm | >12 × $10^{10}$ | 0.9 × $10^{10}$ |
| | Throwing power, percent | 12 | 94 |

Example 2

Example 2 was conducted as in Example 1, only with semipure corundum as the abrasive grain, and it was treated with 0.2 percent by weight of $Al_2O_3$ by dry mixing. The results are shown in Table II:

TABLE II

| Semiprecious corundum Grain 36 (Abramant ®) | | Untreated | Treated with 0.2 percent of $Al_2O_3$ |
|---|---|---|---|
| A | Specific resistance, Ohm × cm | ≧12 × $10^{10}$ | 0.4 × $10^{10}$ |
| | Throwing power, percent | 26 | 96 |
| B | Specific resistance, Ohm × cm | ≧12 × $10^{10}$ | 1.5 × $10^{10}$ |
| | Throwing power, percent | 32 | 96 |
| C | Specific resistance, Ohm × cm | 10 × $10^{10}$ | 0.6 × $10^{10}$ |
| | Throwing power, percent | 50 | 97 |

Example 3

Dural HT grain 60 samples were produced with hygroscopic substances (0.5 percent by weight) by dissolving the substances in water, adding the abrasives, and concentrating by evaporation at 200° C. The throwing power here was no longer measured explicitly since the specific resistance is sufficient as a measure. The results are shown in Table III:

TABLE III

| | Dural HT Grain 60 | |
|---|---|---|
| Hygroscopic Substances | Untreated | Treated |
| $FeCl_3$ | 12 × $10^{10}$ Ohm × cm | <0.02 × $10^{10}$ Ohm × cm |
| $NaHCO_3$ | 12 × $10^{10}$ Ohm × cm | <0.02 × $10^{10}$ Ohm × cm |
| $MgCl_2$ | 12 × $10^{10}$ Ohm × cm | <0.02 × $10^{10}$ Ohm × cm |
| $Ca(NO_3)_2$ | 12 × $10^{10}$ Ohm × cm | <0.02 × $10^{10}$ Ohm × cm |

From the specific resistance values, it is seen that the content of the hygroscopic substances can be considerably less than 0.5 percent by weight to achieve the specific resistance according to the invention. In this regard, a sample of Dural HT grain 36 with 0.01 percent by weight of sodium hydrogen carbonate was produced:

TABLE IV

| | Dural HT Grain 36 | |
|---|---|---|
| Hydroscopic Substance | Untreated | Treated |
| $NaHCO_3$ | >12 × $10^{10}$ ohms × cm | 0.1 × $10^{10}$ ohms × cm |

Example 4

The production charge of high temperature-treated blue corundum grain 36 (Dural HT) was halved and one half was treated according to the invention with 0.2 percent by weight of $Al_2O_3$ (primary particle $d_{50}$ × 20 nm, BET × 100 ± 15 $n^2/g$) by dry mixing in a free falling mixer. With these models, flexible abrasive belts were produced under constant conditions and tested with an industrial belt grinding machine on sheet steel edges (material: DIN 17222, Nr. 10605) with a width of 3 mm. The maximum treatable total edge length and the abraded amount of the belts connected with it were used as a measure for the abrasive performance. The results are shown in Table V.

TABLE V

| Doral HT Grain 36 | Untreated | Treated |
|---|---|---|
| Abraded amount, g | 930 | 1170 |
| Treated edge length, | 6.2 | 8.8 |

TABLE V-continued

| Doral HT Grain 36 | Untreated | Treated |
|---|---|---|
| m | | |

Example 5

The production charge of high temperature-treated blue corundum grain F 24 (Dural HT) was halved and one half was treated according to the invention with 0.2 percent by weight of $Al_2O_3$ (primary particle $d_{50} = 20$ nm, BET = $100 \pm 15$ m$^2$/g) by dry mixing in a free falling mixer. With these models, cutting-off wheels were produced as follows under constant conditions. The composition of the wheels was:
- 19 percent by weight of phenolic resins (powder and liquid)
- 68 percent by weight of abrasive grain
- 13 percent by weight of filler.

The granular starting materials were processed with the addition of the liquid phenolic resin into a free-flowing homogeneous compound and pressed in a pressing mold with the addition of two external fabrics in a press with a pressure of 200 kg/cm$^2$. The hardening of the wheels occurred as usual in an oven at 190° C.

The abrasive performance was determined with an abrasive cutting-off machine (common in the industry) on 18/8 nickel-chromium steel flat bars with a cross section dimension of 50 × 20 mm. For this purpose, per wheel, 10 separating cuts were made and as a measure for the performance of the wheel, the wheel wear connected with it was determined. This is given in terms of "nm-wheel diameter decrease". The results are shown in Table VI:

TABLE VI

Wheel dimension in mm: 230 × 2.5 × 22
Flat bars of 18/8 nickel chromium steel: 50 × 20 mm
10 separating cuts

| Dural HT Grain F 24 | Untreated | Treated |
|---|---|---|
| Diameter decrease, mm | 4 | 4 |
| | 6 | 4 |
| | 5 | 4 |
| Average, mm | 5 | 4 |
| Relative performance factor, percent | 100 | 120 |

What is claimed is:

1. Abrasive grain having an aluminum oxide base, comprising the aluminum oxide base with a hydrophilic substance coated on its surface, the amount of said hydrophilic substance being 0.001 to 5.0 percent by weight relative to the amount of the abrasive grain, measured in grain beds, being smaller than $3.5 \times 10^{10}$ ohms × cm, the hydrophilic substance being a metal oxide in the form of superfine particles with a particle size of the primary particles in the $d_{50}$ value of 1 to 500 nm and a specific surface according to BET of 5 to 500 m$^2$/g.

2. Abrasive grain having an aluminum oxide base, comprising the base with a hydrophilic superfine metal oxide coated on its surface, the amount of said hydrophilic superfine metal oxide being 0.001 to 0.5 percent by weight relative to the amount of the abrasive grain, the specific resistance of the treated abrasive grain, measured in grain beds, being smaller than $3.5 \times 10^{10}$ ohms × cm.

3. The abrasive grain according to claim 1 wherein the amount of substance is 0.1 to 0.5 percent by weight relative to the amount of abrasive.

4. The abrasive grain according to claim 2 wherein the specific resistance of the treated abrasive grain, measured in grain beds, is between $0.05 \times 10^{10}$ and $2.5 \times 10^{10}$ ohms × cm.

5. The abrasive grain according to claim 1 wherein a metal oxide with superfine particles with a particle size of the primary particles in the $d_{50}$ value of 10 to 50 nm and a specific surface according to BET of 50 to 380 m$^2$/g is used as the hydrophilic substance.

6. The abrasive grain according to claim 1 wherein a silicon dioxide, aluminum oxide or titanium dioxide in the form of superfine particles is used as the hydrophilic substance.

7. The abrasive grain according to claim 1 wherein a silicon dioxide, aluminum oxide or titanium dioxide in the form of superfine particles is used as the hydrophilic substance.

8. Abrasive produced by coating a base, which exhibits an adhesion promoter, with said abrasive grain according to claim which has been coated with said hydrophilic superfine metal oxide in the electrical field of 20,000 to 100,000 v, at a relative humidity of 30 to 90 percent in the processing range.

9. Abrasive grain having an aluminum oxide base, the surface of the abrasive grain having been treated with a hydrophilic superfine metal oxide, and the amount of the hydrophilic superfine metal oxide being 0.001 to 5.0 percent by weight relative to the amount of the abrasive grain.

* * * * *

UNITED STATES PATENT AND TRADEMARK OFFICE
CERTIFICATE OF CORRECTION

PATENT NO. : 5,026,404

DATED : Jun. 25, 1991

INVENTOR(S) : Kunz et al.

It is certified that error appears in the above-identified patent and that said Letters Patent is hereby corrected as shown below:

Column 6:
Claim 8, line 3, after "claim" insert --1--.

Signed and Sealed this

Thirteenth Day of December, 1994

Attest:

BRUCE LEHMAN

Attesting Officer

Commissioner of Patents and Trademarks